(12) United States Patent
Chang et al.

(10) Patent No.: US 7,941,112 B2
(45) Date of Patent: May 10, 2011

(54) METHOD AND APPARATUS FOR AUTOMATIC FINE TUNING BASED ON SYNC DETECTION

(75) Inventors: Chiew Mun Chang, Singapore (SG); Hong Li, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 808 days.

(21) Appl. No.: 11/985,898

(22) Filed: Nov. 19, 2007

(65) Prior Publication Data
US 2008/0194218 A1    Aug. 14, 2008

(30) Foreign Application Priority Data

Nov. 24, 2006    (EP) ..................................... 06301177

(51) Int. Cl.
*H04B 1/18*    (2006.01)
*H04N 5/50*    (2006.01)

(52) U.S. Cl. ............... 455/161.1; 455/161.3; 455/164.1; 455/229; 348/732; 348/525

(58) Field of Classification Search ............... 455/161.1, 455/161.3, 164.1, 175.1, 185.1, 191.1, 196.1, 455/227, 229; 348/521, 731, 732, 735, E5.017, 348/E5.097
See application file for complete search history.

(56) References Cited

U.S. PATENT DOCUMENTS

| | | | | |
|---|---|---|---|---|
| 3,858,000 A | * | 12/1974 | Merriweather et al. | 348/735 |
| 4,300,165 A | * | 11/1981 | Kim | 348/735 |
| 4,405,947 A | * | 9/1983 | Tults et al. | 348/732 |
| 4,429,415 A | * | 1/1984 | Chin et al. | 455/164.1 |
| 4,439,787 A | * | 3/1984 | Mogi et al. | 348/735 |
| 4,594,611 A | * | 6/1986 | Sugibayashi et al. | 348/731 |
| 4,689,685 A | * | 8/1987 | Testin et al. | 348/735 |
| 4,823,387 A | * | 4/1989 | Tults | 380/220 |
| 5,126,639 A | * | 6/1992 | Srivastava | 315/364 |
| 5,517,678 A | | 5/1996 | Klank et al. | |

(Continued)

FOREIGN PATENT DOCUMENTS

JP    02086206    3/1990

OTHER PUBLICATIONS

Search Report dated Apr. 4, 2007.

*Primary Examiner* — Duc M Nguyen
(74) *Attorney, Agent, or Firm* — Robert D. Shedd; Jeffrey M. Navon

(57) ABSTRACT

The method according to the invention for adjusting the tuning of a receiver circuit for receiving modulated a high frequency signal within a frequency range, the high frequency signal comprising a sync signal, uses the steps of shifting a frequency of a local oscillator within the frequency range and looking for the sync signal, and storing the value of a first frequency, when a sync signal is recognized. Then, the frequency of the local oscillator is continuously shifted in the same frequency direction across the bandwidth of the modulated high frequency signal by controlling the presence of the sync signal. The frequency, at which the sync signal is lost, is stored as a second frequency. From the first and the second frequency in a further step an optimum tuning frequency, located between the first and second frequency, is calculated for the reception for the high frequency signal. The receiver circuit comprises in particular a sync signal detector coupled to an output of an intermediate frequency filter and a controller circuit coupled to the sync signal detector and a local oscillator for performing the method.

9 Claims, 1 Drawing Sheet

U.S. PATENT DOCUMENTS

| | | | |
|---|---|---|---|
| 5,544,202 A * | 8/1996 | Jackson et al. | 375/376 |
| 5,552,838 A | 9/1996 | Suizu | |
| 5,995,157 A * | 11/1999 | Retter et al. | 348/525 |
| 6,400,421 B1 * | 6/2002 | Sakakibara | 348/732 |
| 6,597,408 B1 | 7/2003 | Oak et al. | |
| 6,625,431 B1 | 9/2003 | Fujii | |
| 2005/0114889 A1 | 5/2005 | Liu et al. | |
| 2005/0117072 A1 * | 6/2005 | Tsubokawa | 348/731 |

* cited by examiner

METHOD AND APPARATUS FOR AUTOMATIC FINE TUNING BASED ON SYNC DETECTION

This application claims the benefit, under 35 U.S.C. §119 of EP Application 06301177.9, filed Nov. 24, 2006.

TECHNICAL FIELD OF THE INVENTION

The invention relates to a method and an apparatus for receiving high frequency signals, in particular for receiving a plurality of video transmissions, and adjusting the tuning of a receiver circuit for identifying carrier frequencies contained in the video transmissions.

BACKGROUND OF THE INVENTION

Television programs, which can be transmitted as analog or digital transmissions via air, cable or a satellite link, include an audio signal and a video signal, both being modulated onto a carrier frequency. The television programs are arranged in respective frequency channels having a defined bandwidth and distance between each other within an allocated frequency range. For receiving a wanted television program, a tuner of a television receiver circuit has to be tuned to the respective channel, so that the television signal can be down-converted and demodulated.

A television receiver circuit for receiving of television programs comprises a mixer and a local oscillator, which is adjusted such, that for the reception of a wanted television program the respective program channel is down-converted by the mixer into a frequency range, which is within the passband range of a subsequent intermediate frequency (IF) filter. A television receiver of this kind is shown in FIG. 1: A television signal, received for example by means of an antenna, is amplified by an RF amplifier A, before it is coupled to a first input of a mixer 1a. To a second input of the mixer 1a a LO frequency signal of a local oscillator 1b is coupled, which is controlled by a channel selector 1c. The mixer 1a, local oscillator 1b and channel selector 1c constitute essential elements of a tuner circuit 1.

The channel selector 1c controls the local oscillator 1b such, that the television signal of a wanted television program is down-converted into a passband range of an intermediate frequency filter 2, for selecting one television signal out of a multitude of television signals within a frequency band.

The output of the IF filter 2 is coupled after amplification to a video detector 3, which provides a demodulated picture signal for a display on a video display monitor and a sound signal. The picture signal contains a horizontal synchronizing (sync) signal as known for controlling the horizontal scanning of the display monitor. The horizontal synchronizing signal is separated from the picture signal by means of a sync signal separator 4.

A television receiver of this kind comprises further an automatic fine tuning (AFT) circuit, because the television signal as transmitted by a respective television broadcaster might be shifted a little bit away from the allocated channel frequency by the broadcaster. The AFT circuit comprises an AFT discriminator 5, which is coupled to the output of the IF amplifier 2, and which provides an error voltage for the local oscillator 1b via a low pass filter 5a. The sync signal from the sync signal separator 4 can be used also for a first program search, by shifting the frequency of the local oscillator 1b in coarse steps through the frequency range of the allocated frequency band, and by detecting whether a sync signal is present or not for respective channel locations.

The horizontal sync signal can be used also for expanding the effective capture range of the AFT circuit, as described in U.S. Pat. No. 4,439,787. When using a television receiver in connection with a video tape recorder providing a video output signal by means of a RF modulator, which modulates the video signal of the tape recorder onto an unused television program channel for the tuner of the television receiver, it may happen that the AFT circuit of the television receiver captures the center frequency of a sound signal of an adjacent television program channel. This can be avoided by using the horizontal sync signal. When no horizontal sync signal is present, the local oscillator frequency is shifted accordingly.

The automatic fine tuning circuit provides a good solution for a reception of a television signal, but because of cost reasons it might be desirable to replace the automatic fine tuning circuit.

In U.S. Pat. No. 6,297,858, a method and apparatus for detecting video transmissions is described, which uses the presence of a synchronization signal to determine whether a video transmission is valid or not valid.

In U.S. Pat. No. 6,597,408 an automatic fine tuning method is described, in which the local oscillator frequency is shifted across the frequency range of a television channel, and when a sync signal is detected, the SNR and the respective frequency is stored. The frequency having the highest SNR is then selected as the tuning frequency for this channel.

SUMMARY OF THE INVENTION

The method according to the invention for adjusting the tuning of a receiver circuit for receiving a modulated high frequency signal within a frequency range, which comprises a sync signal, uses the steps of shifting a frequency of a local oscillator within the frequency range and looking for the sync signal, and storing the value of a first frequency, when a sync signal is recognized. Then, the frequency of the local oscillator is shifted, in particular continuously shifted in the same frequency direction, by controlling the presence of the sync signal. The frequency, at which the sync signal is lost, is stored as a second frequency. From the first and the second frequency in a further step an optimum tuning frequency, located between the first and second frequency, is calculated for the reception for the modulated high frequency signal.

For performing the method, advantageously a controller circuit may be used, which controls already the frequency of the local oscillator. For calculating the optimum tuning frequency, the controller circuit can use a linear interpolation based on the first and the second frequency. As an alternative, a look-up table may be used which comprises reference values stored in a memory because the relationship of the optimum tuning frequency with regard to the first, respectively second frequency, may change within the frequency range of the high frequency signal.

A receiver circuit for performing the method comprises a mixer for down-converting the high frequency signal into an intermediate frequency range, a local oscillator providing a local oscillator frequency for the mixer, and an intermediate frequency filter coupled to an output of the mixer. The intermediate frequency filter has a passband characteristic related to the bandwidth of the high frequency signal for passing through the high frequency signal and for filtering off neighboring high frequency signals. The receiver circuit comprises further a sync signal detector coupled to the intermediate frequency filter for recognizing a sync signal included in the picture signal of the high frequency signal and a controller circuit for controlling the frequency of the local oscillator and for determining an optimum tuning frequency for a specific high frequency signal in accordance with the described method.

The method can be used in particular for a television receiver for providing an automatic program channel search of television programs.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
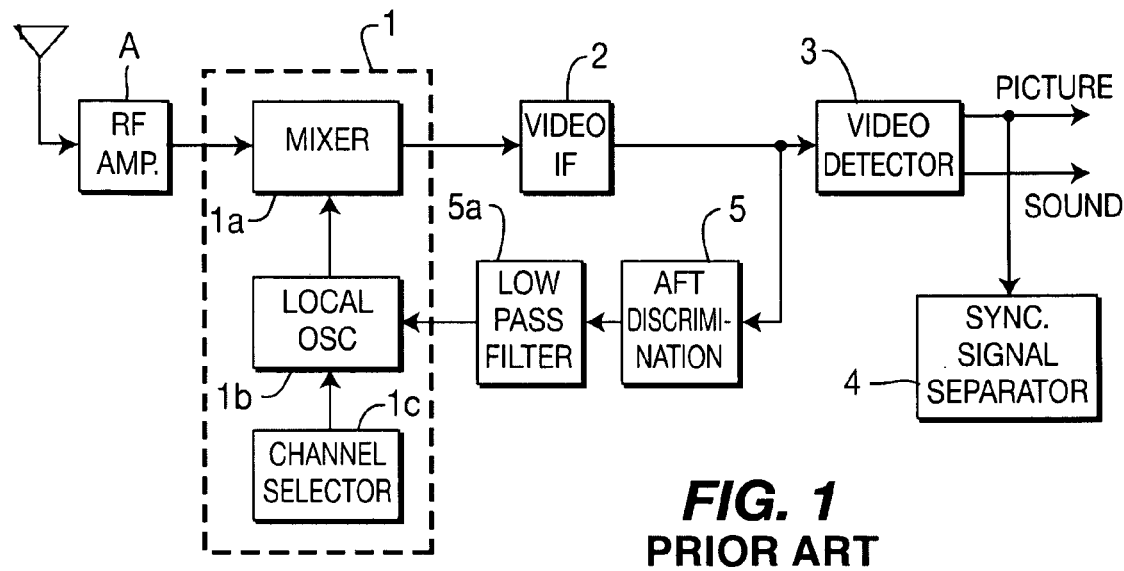
FIG. 1 a receiver circuit for a reception of a television signal, comprising an automatic fine tuning circuit according to prior art, FIG. 2 a receiver circuit comprising a controller circuit for determining an optimized tuning frequency of the local oscillator for a reception of a high frequency signal according to the invention, and FIG. 3 a high frequency range including channels with television programs.
Figure 2:
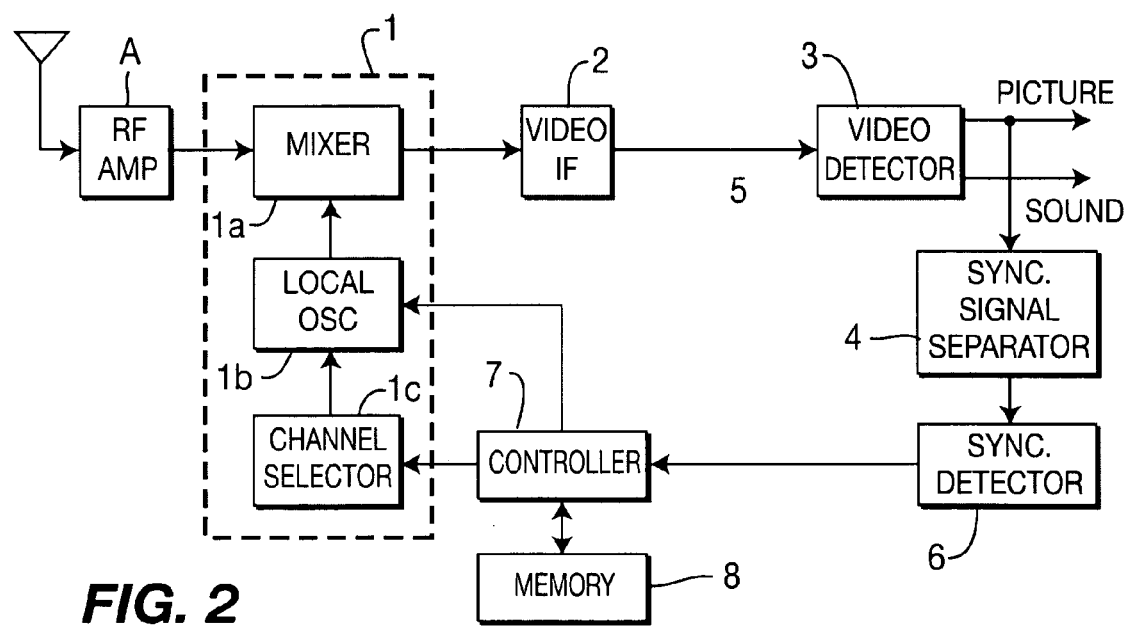

In FIG. 2 a receiver circuit is shown comprising a tuner 1, to which a high frequency signal HF amplified by an RF amplifier A is coupled. The tuner 1 comprises a mixer 1a and a local oscillator 1b, by means of which the high frequency signal is down-converted into an intermediate frequency range, as described before already with regard to the FIG. 1. To the output of the mixer 1a an intermediate frequency filter 2 is coupled, for selecting a wanted high frequency signal out of a plurality of high frequency signals within a frequency band. The local oscillator 1b is adjusted such, that the wanted high frequency signal is shifted by the mixer 1a to the passband range of the intermediate frequency (IF) filter 2, for a passing through of only the wanted down-converted high frequency signal.

The receiver circuit is in this embodiment a television receiver for receiving a multitude of television programs, allocated within a frequency band. The IF filter 2 has therefore a passband bandwidth, for passing through just one television channel and cutting-off neighboring channels. The output of the IF filter 2 is coupled to a video detector 3 for a demodulation of the IF output signal of the IF filter 2. The video detector 3 provides at its outputs a demodulated picture signal and a sound signal. To the picture signal output of the video detector 3 a sync signal separator 4 is coupled, for separating a horizontal synchronizing signal contained in the picture signal, as described already before with regard to FIG. 1.

According to the invention a sync signal detector 6 is coupled to the sync signal separator 4, which provides an information to a controller circuit 7, whether a sync signal is present or not. The controller circuit 7 is for example a microcontroller. The controller circuit 7 is coupled to the local oscillator 1b and to the channel selector 1c for controlling the tuner circuit 1. By means of the sync detector 6, the controller circuit 7 is able to fine tune the local oscillator 1b for providing a high quality picture signal, without the need of an automatic fine tuning circuit.

The controller circuit 7 provides in particular also an automatic program search for a determination and fine tuning of television channels present in the frequency band.

Figure 3:
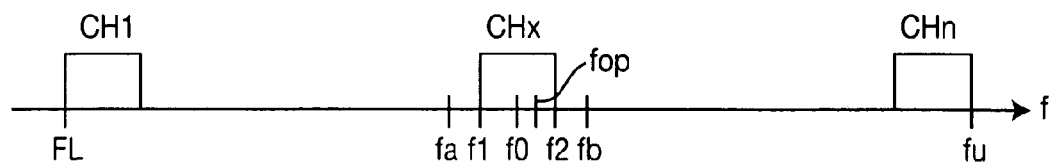

A preferred method for an automatic program tuning is explained with regard to FIG. 3, which shows the allocation of n television channels CH1-CHn within a high frequency band F1-Fu. From the n television channels, not all may be receivable, depending on the location, where the receiver circuit is used. For a first determination of television channels being present at the input of the RF amplifier A, FIG. 2, respectively receivable by the receiver circuit, the controller circuit 7 shifts the LO frequency of the local oscillator 1b in coarse steps through the frequency band. F1-Fu such, that at least an essential part of the frequency band is scanned by means of the mixer 1a and the IF filter 2. For example, the frequency of the local oscillator 1b is shifted such, that the lowest frequency Fl of the frequency band falls into the pass band range of the IF filter 2. Then the frequency of the local oscillator 1b is increased in steps with a step width being in the range of 2-8 MHz, with the result, that higher frequency signals of the output of the RF amplifier A fall into the pass band range of the IF filter 2. The LO frequency is in particular shifted continuously from the lower frequency Fl through the frequency band Fl-Fu to the upper frequency Fu in a preferred embodiment.

When a sync signal is recognized by the controller circuit 7 by means of the sync detector 6, the respective frequency of the local oscillator 1b and/or of the respective RF signal as down-converted and passing through the IF filter 2 is stored in a memory 8. The step size of the coarse steps is in particular smaller than the bandwidth of a television program channel, and therefore all television channels present within the scanned frequency range, for example within the complete frequency band Fl-Fu, can be detected in a first channel search.

The tuning is based on the assumption that the sync signal of a modulated high frequency signal can be recognized within the respective bandwidth of the signal, but not outside the bandwidth of the signal. For a fine tuning of a detected television channel CHx, the LO frequency of the local oscillator 1b is adjusted such by the controller circuit 7, that a sync signal is detected by the sync detector 6 of the respective television channel, for example at a frequency f0 as determined by the coarse channel search described before. Then the controller circuit 7 knows, that a picture carrier is located within an interval of +/−8 MHz around the frequency f0. In a further step, a frequency interval, for example a frequency range of 8 MHz below f0 up to 8 MHz above f0, is continuously scanned by using finely divided steps, which are for example in the range of 30-200 KHz, for a determination of an optimum tuning frequency of the recognized television channel CHx.

The frequency of the local oscillator 1b is in particular shifted away such from the frequency f0 to a frequency fa, where no sync signal is detected anymore by the sync detector 6, for example to a frequency fa=f0−8 MHz. Then the LO signal of the local oscillator 1b is shifted in the direction of the frequency f0. The frequency, at which the sync signal is recognized again, is stored as a first, lower frequency f1 in a memory, for example memory 8. Then the controller circuit 7 continues to shift the frequency of the local oscillator 1b in the direction of the frequency f0 by using the same small step size as used for finding the frequency f1.

Because of the bandwidth of the television channel, for a continuous sequence of finely divided steps the sync signal can be recognized. After a certain number of steps, the sync signal is lost at a frequency fb, after in the previous step at a frequency f2 still a sync signal was recognized. The frequency f2 is then also stored as a second, upper frequency f2 in the memory 8. The controller circuit 7 knows now, that the picture carrier of the television program is located somewhere between the frequencies f1 and f2, because the sync signal has been recognized in this frequency range by the sync detector 6.

The inventors of this invention have recognized, that the location of the picture carrier in the interval f1-f2 has a defined relationship with regard to the frequencies f1 and f2 for all of the television channels or at least for a part of the television channels within the allocated frequency band Fl-Fu. Therefore, an optimized tuning of the local oscillator 1*b* for a certain television channel can be found by means of arithmetic linear interpolation based on the first and second frequencies f1, f2. For example, the optimum tuning frequency fop is a fraction of 0.40×(f2−f1) above the lower frequency f1, respectively 0.60×(f2−f1) below the upper frequency f2, (f2−f1) representing the frequency difference f2−f1. The value of 0.40×(f2−f1) is then stored as the tuning value for the particular channel CHx.

As an alternative, optimum tuning frequencies fop can be determined also by try and error for all television channels CH1-CHn as allocated within the frequency band of a certain country, and which tuning frequencies, related respectively to the television program channels, can be stored in a look-up table. The values of the look-up table are then stored in the memory 8 or in another memory, and when a user performs a coarse automatic channel search as described before with a respective television set, the values of the look-up table are available for the fine tuning of recognized television channels. The recognized television channels can be stored also in the memory 8 or in any other memory. By means of the automatic program search therefore the control values are determined for the controller circuit 7 to control the channel selector 1*c* for a tuning of all the television channels.

The look-up table provides therefore preset values for frequency ranges, in which a sync signal is detected by the sync detector 6 corresponding to a television program. By the fine tuning of the television channels by means of the finely divided steps as described before, the frequencies f1 and f2 are determined and the look-up table provides the data, where the picture carrier is located within the frequency interval f1-f2. The look-up table can be used advantageously, when the relationship of the frequency of the picture carrier with regard to the lower and upper frequencies f1, f2 is not constant for the complete frequency band Fl-Fu, which may be caused by thresholds as included in the video detector 3 and the sync signal separator 4.

The circuit blocks as used in FIG. 2 do not relate necessarily to integrated circuits but can be circuits integrated within one or several integrated circuits 6*r* may consist of discrete circuit parts, and are here used only to illustrate the present invention. In particular the memory 8 or parts of the memory 8 may be included in the controller circuit 7. Also the sync detector 6 and/or the sync signal separator 4 may be included in the controller circuit 7, also the channel selector 1*c*.

The method for fine tuning of a television program has been explained before with regard to analog television signals, but the method can be used also accordingly for digital television signals. In a digital television signal a sync signal is included which can be found by means of a digital sync signal detector, or by converting the digital picture signal into an analog picture signal for using an analog sync signal detector. For the digital television programs then also an optimized frequency fop can be found within a frequency interval f1-f2 for a certain channel CHx, by shifting of the LO frequency of a respective local oscillator.

The method is also not restricted to television programs but can be used also for other high frequency signals being arranged within a frequency band, and which comprise also a sync signal. Also other embodiments of the invention can be made by a person skilled in the art without departing from the spirit and scope of the invention, the invention resides therefore in the claims herein after appended.

The invention claimed is:

1. A method for adjusting the tuning of a receiver circuit comprising a local oscillator for a reception of a modulated high frequency signal within a frequency range, the high frequency signal comprising a sync signal, the method comprising the steps of
    shifting a frequency of the local oscillator across a section of the frequency range and looking for the sync signal, the section including the total bandwidth of the modulated high frequency signal,
    storing the value of a first frequency, when a sync signal is recognized,
    continuing to shift the frequency of the local oscillator in the same frequency direction and watching the presence of the sync signal,
    storing the value of a second frequency, when the sync signal is lost,
    calculating a tuning frequency for the reception the high frequency signal by including in the calculation the value of one or both of said first and second frequency, the tuning frequency being located between the first and second frequency.

2. Method according to claim 1, with the further step of using an arithmetical calculation with linear interpolation based on the first and second frequency for the determination of the tuning frequency.

3. Method according to claim 1, with the further step of using a look-up table comprising reference values stored in a memory for the calculation of the tuning frequency, which reference values are associated with frequencies of the frequency range.

4. Method according to claim 1, with the further step of providing an automatic program search by shifting the local oscillator frequency in coarse steps through the frequency range for a first recognition of sync signals of present modulated high frequency signals, and when recognizing a sync signal, shifting the local oscillator frequency in fine steps through a frequency interval around the frequency of the recognized sync signal for a determination of the optimum tuning frequency.

5. Method according to claim 4, with the further step of continuing to shift the frequency of the local oscillator within the frequency range for a determination of all tuning frequencies of modulated high frequency signals being present within the frequency range and storing the tuning frequencies in a memory for a program selection.

6. Method according to claim 5, with the step of shifting the frequency of the local oscillator in frequency steps being in the range of 2-8 MHz for recognizing of a television channel within the frequency range, and for using frequency steps in the range of 30-200 kHz for a determination of the tuning frequency of a recognized television channel.

7. Receiver circuit comprising a mixer for down-converting a high frequency signal, a local oscillator providing a LO frequency for the mixer, an intermediate frequency filter coupled to an output of the mixer, a sync signal detector coupled to an output of the intermediate frequency filter, and a controller circuit coupled to the sync signal detector and to the local oscillator for performing a method according to claim 1.

8. Receiver circuit according to claim 7, comprising a first memory with stored values of a look-up table for an optimized channel setting.

9. Receiver circuit according to claim 7, comprising a second memory for storing reference values for program channels as determined by an automatic program search.

\* \* \* \* \*